(12) United States Patent
Beal et al.

(10) Patent No.: US 11,915,707 B1
(45) Date of Patent: Feb. 27, 2024

(54) OUTCOME-ORIENTED DIALOGS ON A SPEECH RECOGNITION PLATFORM

(71) Applicant: Amazon Technologies, Inc., Seattle, WA (US)

(72) Inventors: Jeff Bradley Beal, Edgewood, WA (US); Kevin Robert Charter, Seattle, WA (US); Ajay Gopalakrishnan, Seattle, WA (US); Sumedha Arvind Kshirsagar, Seattle, WA (US); Nishant Kumar, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 17/346,916

(22) Filed: Jun. 14, 2021

Related U.S. Application Data

(63) Continuation of application No. 16/684,843, filed on Nov. 15, 2019, now Pat. No. 11,037,572, which is a
(Continued)

(51) Int. Cl.
*G10L 15/22* (2006.01)
*G06F 3/16* (2006.01)
*G10L 17/00* (2013.01)

(52) U.S. Cl.
CPC .............. *G10L 17/00* (2013.01); *G06F 3/167* (2013.01); *G10L 15/22* (2013.01); *G10L 2015/223* (2013.01)

(58) Field of Classification Search
CPC ................................. G10L 15/22; G10L 17/00
See application file for complete search history.

(56) References Cited

U.S. PATENT DOCUMENTS

| 6,785,651 B1 | 8/2004 | Wang |
| 7,418,392 B1 | 8/2008 | Mozer et al. |

(Continued)

FOREIGN PATENT DOCUMENTS

| KR | 20070006759 A | * | 1/2007 |
| WO | WO2011088053 A2 | | 7/2011 |

OTHER PUBLICATIONS

Office Action for U.S. Appl. No. 16/684,843, dated Sep. 1, 2020, Beal, "Outcome-Oriented Dialogs on a Speech Recognition Platform", 12 Pages.
(Continued)

*Primary Examiner* — Shreyans A Patel
(74) *Attorney, Agent, or Firm* — Lee & Hayes P.C.

(57) ABSTRACT

A speech recognition platform configured to receive an audio signal that includes speech from a user and perform automatic speech recognition (ASR) on the audio signal to identify ASR results. The platform may identify: (i) a domain of a voice command within the speech based on the ASR results and based on context information associated with the speech or the user, and (ii) an intent of the voice command. In response to identifying the intent, the platform may perform multiple actions corresponding to this intent. The platform may select a target action to perform, and may engage in a back-and-forth dialog to obtain information for completing the target action. The action may include streaming audio to the device, setting a reminder for the user, purchasing an item on behalf of the user, making a reservation for the user or launching an application for the user.

20 Claims, 9 Drawing Sheets

Related U.S. Application Data continuation of application No. 15/663,514, filed on Jul. 28, 2017, now Pat. No. 10,482,884, which is a continuation of application No. 14/109,738, filed on Dec. 17, 2013, now Pat. No. 9,721,570.

(56) References Cited

U.S. PATENT DOCUMENTS

| | | | |
|---|---|---|---|
| 7,720,683 B1 | 5/2010 | Vermeulen et al. | |
| 7,774,204 B2 | 8/2010 | Mozer et al. | |
| 8,219,407 B1 | 7/2012 | Roy et al. | |
| 8,306,908 B1* | 11/2012 | Barker | G06Q 30/0224 |
| | | | 705/26.7 |
| 9,009,025 B1* | 4/2015 | Porter | G10L 15/197 |
| | | | 704/251 |
| 9,721,570 B1 | 8/2017 | Beal et al. | |
| 9,728,188 B1 | 8/2017 | Rosen et al. | |
| 2003/0125955 A1 | 7/2003 | Arnold et al. | |
| 2004/0085162 A1 | 5/2004 | Agarwal et al. | |
| 2006/0009973 A1 | 1/2006 | Nguyen et al. | |
| 2006/0116877 A1 | 6/2006 | Pickering et al. | |
| 2006/0184370 A1 | 8/2006 | Kwak et al. | |
| 2011/0093266 A1* | 4/2011 | Tham | H04M 1/663 |
| | | | 704/246 |
| 2012/0109652 A1* | 5/2012 | Levit | G10L 15/22 |
| | | | 704/E15.001 |
| 2012/0223885 A1 | 9/2012 | Perez | |
| 2012/0245941 A1 | 9/2012 | Cheyer | |
| 2012/0290290 A1 | 11/2012 | Tur et al. | |
| 2013/0080167 A1* | 3/2013 | Mozer | G10L 15/22 |
| | | | 704/E17.001 |
| 2013/0275164 A1 | 10/2013 | Gruber et al. | |
| 2014/0039893 A1* | 2/2014 | Weiner | G10L 15/22 |
| | | | 704/E17.001 |
| 2014/0164953 A1 | 6/2014 | Lynch et al. | |
| 2014/0278424 A1 | 9/2014 | Deng et al. | |
| 2015/0161999 A1* | 6/2015 | Kalluri | G06F 16/433 |
| | | | 704/257 |
| 2015/0228274 A1 | 8/2015 | Leppanen et al. | |
| 2017/0083285 A1 | 3/2017 | Meyers et al. | |

OTHER PUBLICATIONS

Non Final Office Action dated Dec. 11, 2018 for U.S. Appl. No. 15/663,514 "Outcome-Oriented Dialogs on a Speech Recognition Platform" Beal, 13 pages.

Office action for U.S. Appl. No. 14/109,738, dated Dec. 15, 2015, Beal et al., "Outcome-Oriented Dialogs on a Speech Recognition Platform", 16 pages.

Office Action for U.S. Appl. No. 15/663,514, dated Apr. 17, 2019, Beal, "Outcome-Oriented Dialogs on a Speech Recognition Platform", 14 pages.

Office Action for U.S. Appl. No. 14/109,738, dated Jul. 22, 2015, Beal et al., "Outcome-Oriented Dialogs on a Speech Recognition Platform", 16 page.

Office action for U.S. Appl. No. 14/109,738, dated Sep. 29, 2016, Beal et al., "Outcome-Oriented Dialogs on a Speech Recognition Platform", 17 pages.

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

OUTCOME-ORIENTED DIALOGS ON A SPEECH RECOGNITION PLATFORM

CROSS REFERENCE TO RELATED APPLICATIONS

This application is a continuation of, and claims priority to, U.S. application Ser. No. 16/684,843, filed Nov. 15, 2019 and U.S. application Ser. No. 15/663,514, filed Jul. 28, 2017 now U.S. Pat. No. 10,482,884 and U.S. application Ser. No. 14/109,738, filed Dec. 17, 2013 now U.S. Pat. No. 9,721,570, incorporated herein by reference.

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
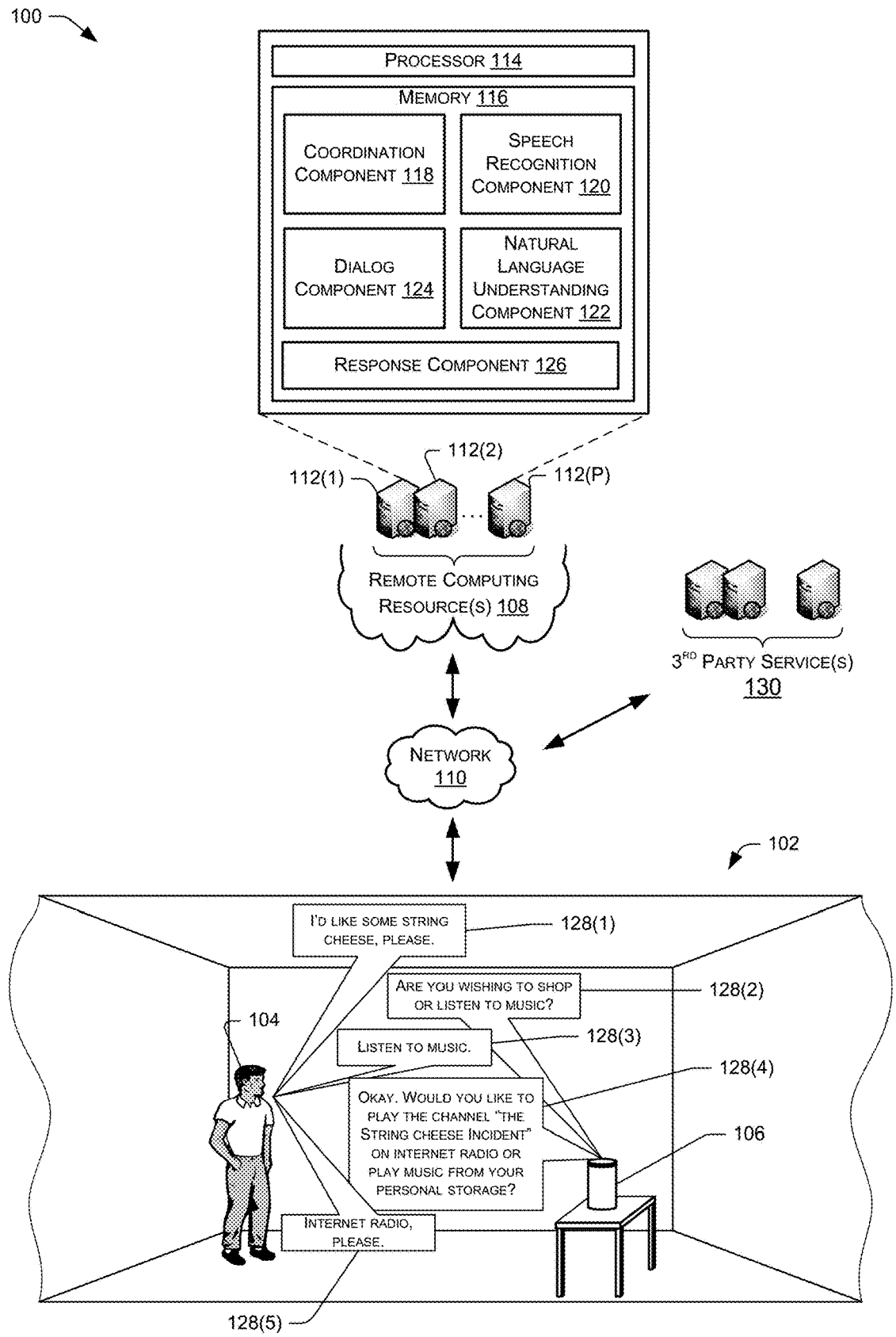
FIG. 1A shows an illustrative voice interaction computing architecture set in a home environment. The architecture includes a voice-controlled device physically situated in the home, along with a user who provides a voice command to the device. In turn, the device utilizes computing resources that are remote from the environment to determine the intent of the user expressed in the voice command.

This disclosure describes, in part, a speech recognition platform configured to receive an audio signal that includes speech from a user and perform automatic speech recognition (ASR) on the audio signal to identify ASR results. In addition, the platform may identify: (i) a domain of a voice command within the speech based on the ASR results and based on context associated with the speech or the user, and (ii) an intent of the voice command. In response to identifying the intent of the voice command, the platform may perform a corresponding task, which may include providing audio for output on a voice-controlled device that initially captured the speech of the user. The task may also include streaming audio to the device, setting a reminder for the user, purchasing an item on behalf of the user, making a reservation for the user, launching an application for a user or any other type of action performed on behalf of the user. The speech recognition platform, in combination with the device, may therefore facilitate efficient interactions between the user and a voice-controlled device.

In some instances, a user request may be associated with multiple possible tasks. For instance, a user may request to play music, which may include playing a particular song, album, artist, internet radio station, or the like. In response, a dialog management system may select, from the multiple possible tasks, a target task to perform. Each task may be associated with multiple fields that, when each associated with a respective value, results in the task being actionable. For instance, a "play song" task may be actionable with the following fields each have values: artist name, album name, song name. When those pieces of information are know, the system may be able to play the appropriate song. In order to make a target task actionable, the system may need to obtain additional information by performing one or more actions. Obtaining additional information may include inferring information based on information found within the user request, inferring information based on known information associated with the user, or engaging in a dialogue with the user in order to obtain the information.

Again, in order to make tasks actionable, the techniques may perform certain actions, such as asking the user a question or inferring information from previous speech or the user, previously stored data, or the like. Therefore, the techniques may select one or more actions to perform in order to make a task actionable based on multiple factors, such as which field an action is intended to fill, a probability that performing the action will result in the acquisition of a value for that field, and/or a cost associated with performing the action, with costs generally being greater based on an amount of interaction with the user (e.g., based on whether or not the action includes asking the user a question, based on a number of questions, or the like).

In addition to looking at the outcome of performing an action to make a task actionable, the dialog management system may also be outcome-oriented in that the system may analyze the result of completing each possible task when working towards making a target task actionable. For instance, when selecting which of multiple tasks most likely requested by the user, the system may look at a probability that the user requested the respective task (e.g., based on previous interactions with the user and/or based on behavior of multiple other users) and/or a cost of making the task actionable (e.g., a number of questions to the user needed to make the task actionable).

After identifying a task to perform, the system may select which action(s) to perform in order to make the task actionable. Actions may include requesting information from the user (e.g., via output of an audible question) inferring information, or the like. In this regard, each possible action may be associated with a corresponding outcome (e.g., information it is intended to obtain, such as a name of an music artist the user may wish to listen to), expressed as a predicate with an associated probability that performance of the action will result in obtaining this information. Each action may also be associated with a cost, which may be based on time and/or resources needed to perform the action. For example, the cost may be based on a latency associated with obtaining the information, an amount of dialogue with the user, and the like. In some instances, a cost is considered greater as the amount of dialogue required by the action increase (e.g., the greater the number of questions, the greater the cost). In some examples, the dialog management system is biased to select, as actions to perform, actions that have relatively higher probabilities and relatively lower costs.

The speech-recognition platforms described herein allows a user within an environment to audibly state a request to a voice-controlled device, such as a request to play a certain song, a request to purchase an item, a request to set a reminder for the user or the like. The voice-controlled device may capture sound from within the environment and generate an audio signal for analysis of any speech therein. The device may then either perform the analysis or provide the audio signal for analyzing by another entity. In some instances, the device provides the audio signal over a network to a speech recognition platform that is remote from the environment (e.g., that resides in a data center or "in the cloud").

In response to receiving the audio signal, a coordination component of the speech recognition platform may first obtain any context associated with the speech or with the user who provided the speech. This context may be based on previous interactions between the user and the device (or other voice-controlled device(s)), based on a location of the user, preferences of the user, information from an application called by the speech of the user or any other type of context.

The coordination component may then provide the audio signal and the retrieved context to a speech recognition component. In response to receiving the audio signal, the speech recognition component may perform automatic speech recognition (ASR) on the audio signal to generate ASR results. The ASR results may take the form of a list that includes the most likely words or phrases spoken by the user (an "N-best list"), a lattice structure that includes probabilities of different strings of phonemes spoken by the user or the like. In some instances, the speech component performs ASR using grammar and/or language models associated with multiple different domains. As described below, a domain may represent a discrete set of related activities (or "tasks") that a user may request performance of by providing speech to a voice-controlled device. For instance, example domains may include shopping, listening to music, calendaring, reminder setting, travel reservations, to-do list creation, and the like.

After determining the ASR results, the speech recognition component may provide the ASR results and the context to a natural language understanding (NLU) component configured to identify multiple different intents potentially represented by the speech. In some instances, each intent is associated with a respective domain, and represents a discrete activity of the set of related activities within a particular domain. For instance, the "shopping" domain may include an intent to purchase a particular digital music file, an intent to purchase a grocery item, an intent to purchase a gift card for another user, an intent to simply make some type of purchase, and intent to engage in shopping related activity, or the like. The "music" domain may include an intent to play a particular song owned by the user, launch a particular music service, send a particular song to a friend or the like.

As described in further detail below, the NLU component may identify intents within each of multiple different domains (e.g., each domain known by the speech recognition platform). The NLU component may identify each intent by comparing the ASR results to known entities associated with each particular intent as well as by filling slots (or "fields") of the intent based on the received context. For instance, the music domain may include a database of entity names associated with music, such as "internet radio", "play", "pause" and the like. In addition, the NLU component may fill a slot based on the context, such as previous speech provided by the user or the like. If, for example, the user had previously requested to pause a particular song and thereafter requested that the voice-controlled device to "please un-pause my music", the NLU component may utilize the context to fill a slot associated with the name of the song that the user currently wishes to play—namely the song that was playing at the time that the user requested to pause the music.

After identifying multiple different intents associated with multiple different domains, the NLU component may rank the intents based on one more criteria. For instance, the NLU component may rank the intents based on a closeness of a speech-recognition match between a corresponding intent and entities associated with the intent, based on requests previously provided by the user and/or based on any other array of factors.

After ranking the intents, the NLU component may provide the ranked list of intents (potentially spanning multiple different domains) to the coordination component. In response, the coordination component may provide the ranked list of intents to a dialog component, which may in turn attempt to select a domain associated with the speech. That is, the dialog component attempts to determine which domain the user is most likely requesting to operate within. For example, this component may attempt to determine whether the user is trying to shop for an item, listen to music, set a reminder, add a to-do item on a to-do list or the like.

If the dialog component is able to determine a domain with a threshold amount of confidence, then the dialog component may proceed to select a domain. Otherwise, this component may identify a question to pose to the user for the purpose of identifying the domain and may provide audio indicative of this question for output on the device. For instance, the dialog component may provide the following audio to the voice-controlled device: "are you intending to shop for an item or listen to music?" The device may then capture sound that includes a user's response to the question and a corresponding audio signal may be provided back to the speech recognition platform for aiding in identifying the domain associated with the user's speech.

After the dialog component selects a domain associated with the speech, this component may provide an indication of the selection back to the coordination component. The coordination component may then provide to a dialog engine an indication of the intents from the ranked list of intents that are associated with the selected domain. If the selected domain is the "music" domain, for instance, then the coordination component may provide each intent from the list of N-best intents that is associated with the "music" domain. The dialog engine then attempts to select a single intent from this list of intents.

Again, the dialog engine may select a particular intent if the engine is able to make such a selection with a threshold amount of confidence. If not, then the dialog engine may provide audio to the device for helping deduce the intent. For instance, the engine may provide the following audio to the device: "Did you wish to launch internet radio or listen to music you own"? Again, the device may then capture sound that includes a user's response to the question and a corresponding audio signal may be provided back to the speech recognition platform for aiding in identifying the intent associated with the user's speech.

After selecting an intent, the dialog component may perform one or more tasks corresponding to the user's speech. For instance, if the speech recognition platform determines that the user has requested to launch a particular channel of a particular internet radio service, then the platform may provide audio to the device (e.g., "I will turn on your station momentarily") as well as begin streaming the particular channel to the device. By selecting a domain associated with a user's speech and thereafter selecting a particular intent from the domain, the speech recognition platform is able to efficiently and accurately respond to voice commands of the user.

In some instances, an identified intent may be associated with multiple possible tasks that the system can perform in response to receiving a user request. In these instances, the dialog component may identify these possible tasks and may select a target task to perform. In some instances, additional information may be needed to complete a target task, and different actions may be taken to obtain some or all of this information. Which action to perform may be selected with reference to outcomes associated with the multiple possible actions.

For example, the dialog component may identify, for each of the multiple possible actions: (1) one or more fields that, when filled with respective values, results in the respective possible action being actionable, and (2) which of the one or more fields have values based on the initial speech/request from the user. Thereafter, the dialog component may select a target action from the multiple possible actions based at least in part on: (1) the multiple possible actions; (2) the one or more fields associated with each respective possible action, and (3) which of the one or more fields associated with the respective possible action have values. In addition to looking at this intended outcome of each action, the dialog component may also take into account: (1) a probability that performing that action will result in acquisition of the data the action is intended to gather, and (2) a cost of performing the action, the with cost increasing based on an amount of user interaction associated with the action. After selecting the action based on some or all of this information, the dialog component may cause performance of the action. This may include identifying an appropriate dialogue to engage in with the user, inferring information from the speech/request or the user, or the like.

Furthermore, an array of different applications may work with the speech recognition platform to perform actions requested by the user. For example, these applications may include a shopping application, a to-do list application, a music application, a navigation application, a search-engine application or any other similar or different type of application. In one example, the speech recognition platform interfaces with a shopping application that enables a user to purchase items via voice commands processed and recognized by the speech recognition platform. In another example, a to-do list application enables a user to add and check off items on a to-do list of the user via voice commands. In addition, the speech recognition platform may also help the user perform the items on the list, through appropriate reminders and the like.

To provide a relatively basic example, envision that a user provides the following voice command: "Buy Harry Potter and the Deathly Hallows 2". In response to receiving an audio signal or another type of input including this command, the orchestration component may retrieve any context from the context store. For instance, the context store could provide an indication that the user's last request was to purchase a DVD version of Harry Potter and the Deathly Hallows 1. The orchestration component may then provide the audio signal and the context to the speech recognition component, which may perform ASR on the audio signal and provide ASR results and the context to the NLU component.

In response, the NLU component may use the ASR results and the context to determine multiple different potential intents associated with the user's request, with each intent being associated with a respective domain. In this example, at least one of the intents will include a "purchase" intent with a slot for the item being filled in as "Harry Potter and the Deathly Hallows 2". In some instances, the NLU component may use the context described above to fill in an item-type slot with "DVD". After identifying multiple intents, the NLU component may rank the intents and provide a ranked list of intents to the orchestration component. The orchestration component may in turn provide this list to the dialog component, which may either select a domain or engage in a dialog with the user to determine a domain. In this example, the dialog component determines that the user's request is associated with the "shopping" domain.

After making this determination, the dialog component may provide an indication of this selection to the orchestration component. Thereafter, the orchestration component may then provide, to the dialog component, those intents from the ranked list of intents that are associated with the shopping domain. The dialog engine may then attempt to select a single intent, or may decide to engage in a dialog with the user to make this determination. In this example, the dialog engine may decide to ensure that the user wishes to purchase the DVD rather than a book or other version of the identified content item. As such, the dialog component may ask the user the following question: "Would you like to purchase the DVD or the book?"

In this example, the user states "DVD" and an audio signal including this speech is passed from the device that captured the sound to the orchestration component. In response to receiving this indication, the dialog component may select an intent ("purchase a DVD version of Harry Potter and the Deathly Hallows 2") and may identify multiple possible tasks associated with the intent. For instance, the tasks may include purchasing a standard version of the DVD, purchasing a high-definition (HD) version of the DVD, or the like. The dialog component may then select a target task (with or without engaging in a dialog with the user) and may determine that the shopping application is able to perform the task. As such, the dialog component provides an indication to a response component of the selected action, and the shopping application takes the selected task, forms a search for the identified DVD and performs some task in response. For instance, the application may automatically purchase the DVD for the user, may provide several purchase options back to the user or may perform some other action in response.

In another example, a to-do list application may work in conjunction with the speech recognition platform to help a user add items to and complete items from a to-do list of the user. For instance, envision that a user states to his or her device the following sentence: "Remind me to pick up Grace from soccer at 6 pm" (or provide this textually or in another manner). Again, the orchestration component may receive an audio signal including this speech and, in response, may retrieve any context stored in the context store. The orchestration component then passes the audio signal and the context to the speech recognition component, which provides ASR results to the NLU component. The NLU component then creates a ranked list of potential intents, each with an associated domain as described above, and provides this list to the orchestration component.

In response to receiving the list, the orchestration component provides the list to the dialog component for selection of a domain. Here, the dialog component determines that the domain associated with the user's command is the "to-do" domain. In addition, the dialog component may select the intent corresponding to picking up Grace from soccer at 6 pm and may invoke the to-do list application. The to-do list application may add this item to the to-do list of the user that provided the command.

As 6 pm approaches, the to-do list application may provide one or more reminders to the user. For instance, the application may provide audio for output at the device that captured the user's speech (e.g., "Remember to pick up Grace from soccer in 15 minutes"). Additionally or alternatively, the to-do list application may send a text message including this message to a phone of the user, may send an email including this message or may remind the user in any other way.

Furthermore, the to-do list application may provide additional intelligence to not only help the user perform the requested task, but also other items on the user's to-do list. For instance, the application may determine, from context stored in the context store, that Grace's soccer practice is located at a field that is near a local grocery store. The to-do list application may also determine that the user has previously asked the application to remind the user to purchase a certain set of items at the store. As such, the to-do list application may provide a message to the user (e.g., audibly, via text or email, etc.) stating the following: "You may also want to stop by the grocery store on $5^{th}$ and Grand on the way home and buy bananas and milk." Furthermore, the to-do list application may be configured to remove items from the user's to-do list in response to receiving an indication from the user that a particular task has been performed.

While a few non-limiting examples are described above and below, the devices and techniques described herein may apply for an array of other purposes. Furthermore, the devices and techniques described above may be implemented in a variety of different architectures and contexts. One non-limiting and illustrative implementation is described below. In this example, certain components are described as residing on servers that are remote from a voice-controlled assistant. It is to be appreciated, however, that some or all of these components may additional or alternatively reside on the device or at other locations in other implementations.

FIG. 1A shows an illustrative voice interaction computing architecture 100 set in a home environment 102 that includes a user 104. The architecture 100 also includes an electronic voice-controlled device 106 with which the user 104 may interact. In the illustrated implementation, the voice-controlled device 106 is positioned on a table within a room the home environment 102. In other implementations, it may be placed in any number of locations (e.g., ceiling, wall, in a lamp, beneath a table, under a chair, etc.). Further, more than one device 106 may be positioned in a single room, or one device may be used to accommodate user interactions from more than one room.

Generally, the voice-controlled device 106 has at least one microphone and at least one speaker to facilitate audio interactions with the user 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 2.

The microphone of the voice-controlled device 106 detects audio from the environment 102, such as sounds uttered from the user 104. As described in further detail below, the voice-controlled device 106 includes a processor and memory, which may store or otherwise has access to a speech-recognition engine. As used herein, a processor may include multiple processors and/or a processor having multiple cores. The speech-recognition engine performs speech recognition on audio captured by the microphone, such as utterances spoken by the user 104. The voice-controlled device 106 may perform certain tasks in response to recognizing different speech from the user 104. The user may speak predefined commands (e.g., "Awake"; "Sleep"), or may use a more casual conversation style when interacting with the device 106 (e.g., "I'd like to go to a movie. Please tell me what's playing at the local cinema.").

The user 104 may also utilize the voice-controlled device 106 for outputting audio (e.g., playing music) via the speaker of the device 106 or via one or more speakers within the environment 102 that the device 106 controls. The user 104 may also utilize the voice-controlled device 106 for engaging in voice communications (e.g., "telephone calls") with users that are remote from the environment 102.

In some instances, the voice-controlled device 106 may operate in conjunction with or may otherwise utilize computing resources 108 that are remote from the environment 102. For instance, the voice-controlled device 106 may couple to the remote computing resources 108 over a network 110. As illustrated, the remote computing resources 112 may be implemented as one or more servers 112(1), 112(2), . . . , 112(P) and may, in some instances form a portion of a network-accessible computing platform implemented as a computing infrastructure of processors, storage, software, data access, and so forth that is maintained and accessible via a network such as the Internet. The remote computing resources 112 do not require end-user knowledge of the physical location and configuration of the system that delivers the services. Common expressions associated for these remote computing devices 112 include "on-demand computing", "software as a service (SaaS)", "platform computing", "network-accessible platform", "cloud services", "data centers", and so forth.

The servers 112(1)-(P) include a processor 114 and memory 116. The memory 116 may have access to and utilize the speech-recognition engine for receiving audio signals from the device 106, recognizing speech and, potentially, causing performance of an action in response. In some examples, the voice-controlled device 106 may upload audio data to the remote computing resources 108 for processing, given that the remote computing resources 108 may have a computational capacity that far exceeds the computational capacity of the voice-controlled device 106. Therefore, the voice-controlled device 106 may utilize the speech-recognition engine at the remote computing resources 108 for performing relatively complex analysis on audio captured from the environment 102.

Regardless of whether the speech recognition occurs locally or remotely from the environment 102, the voice-controlled device 106 may receive vocal input from the user 104 and the device 106 and/or the resources 108 may perform speech recognition to interpret a user's operational request or command. The requests may be for essentially any type of operation, such as database inquires, requesting and consuming entertainment (e.g., gaming, finding and playing music, movies or other content, etc.), personal information management (e.g., calendaring, note taking, etc.), online shopping, financial transactions, and so forth.

The voice-controlled device 106 may communicatively couple to the network 110 via wired technologies (e.g., wires, USB, fiber optic cable, etc.), wireless technologies (e.g., RF, cellular, satellite, Bluetooth, etc.), or other connection technologies. The network 110 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

As illustrated, the memory 116 of the remote computing resources 108 may include a coordination component 118, a speech recognition component 120, a natural language understanding (NLU) component 122, a dialog component 124 and a response component 126. The coordination component 118 may receive an audio signal generated by the device 106 and may generally begin the process of determining how best to respond to user's speech from the audio signal. For instance, the coordination component 118 may retrieve any context associated with the speech (e.g., based on prior speech from the user 104) and may provide the context and/or the audio signal to the speech recognition component 120.

In response to receiving the audio signal, the speech recognition component 120 may perform automatic speech recognition (ASR) on the audio signal to generate ASR results. The speech recognition component 120 may then provide the ASR results and the context to the NLU component 122. In some instances, the NLU component 122 receives the context directly from the coordination component 118 or from another entity. In either instance, the NLU component 122 may identify multiple possible intents of the user's speech across multiple different domains based on the ASR results and the context. As described above, a domain may represent a related set of activities (e.g., shopping, music, calendaring, etc.), while an intent within a domain may represent one of the activities (e.g., buying a particular item, listening to a particular song, setting up a particular appointment, etc.). The NLU component 122 may also rank the intents according to one or more factors and may provide the top N intents to the coordination component 118 or another entity.

The coordination component 118 may then provide the ranked list of N-intents to the dialog component 124. In some instances, the dialog component 124 receives these N intents directly from the NLU component 122 or from another entity. After receiving the N intents, each associated with a particular domain, the dialog component 124 may attempt to select a domain most likely associated with the user's speech. If the dialog component 124 can make this determination with a threshold amount of confidence, then the component 124 may select a domain. If not, then the component 124 may proceed to engage the user 104 in a dialog. For instance, the dialog component 124 may provide audio for output at the voice-controlled device 106, with the audio indicating a question to pose to the user 104. The microphone(s) of the device 106 may generate an audio signal based on the user's response, which may be thereafter used by the dialog component 124 to select a domain.

After selecting a domain, the component 124 may provide an indication of this selection back to the coordination component 118, which may provide an indication of the selected domain (and an indication of the intents of the N intents associated with the selected domain) to a dialog engine for selecting the intent. The dialog engine may select the intent or may again engage the user 104 in a dialog for the purpose of selecting the intent.

After selecting an intent, the dialog engine 124 may identify multiple possible tasks that are associated with the selected intent. The dialog engine 124 may select one of these tasks as a target task based at least in part on outcomes of the tasks. As described above, the dialog engine may take into account respective probabilities that the user desires the system to perform the respective tasks, as well as respective costs associated with the respective tasks, when selecting a target task. After selecting a target task, the dialog component 124 may select and perform one or more actions (e.g., interring information, engaging in a dialogue with the use, etc.) in order to obtain the information needed make the target task actionable and perform the target task. Techniques for selecting actions to perform for a target task are discussed in further detail below.

After selecting an intent, the dialog engine 124 may provide an indication of this selection to the response component 126, which may perform one or more tasks corresponding to the selected intent. This may include providing audio for output on the device 106, initiating a purchase for the user 104, calendaring an appointment for the user 104 or the like. In some instances, the response component 126 may integral with the dialog component itself, or the two components may be thought of as a single component.

FIG. 1A, for instance, illustrates the user providing an example request 128(1). Here, the user 104 states "I'd like some string cheese, please." In response to generating an audio signal based on this audio, the device 106 may provide the audio signal to the remote computing resources 108. In response, the remote computing resources 108 may provide audio for output back to the device to aid in determining a domain associated with the user's speech. Here, the remote computing resources 108 provide audio for asking the user the following question 128(2): "Are you wishing to shop or listen to music?" In this example, the remote computing resources 108 (and, more specifically, the dialog component 124) is attempting to determine whether the user's speech should be associated with the "music" domain or the "shopping" domain.

In response, the user 104 provides the following reply 128(3): "Listen to music". The device 106 generates an audio signal that includes this audio and provides the signal to the remote computing resources 108. In response, the dialog component 124 may determine that the user's speech is associated with the "music" domain. As such, the remote computing resources 108 may proceed to attempt to determine an intent of the user's speech within the "music" domain. Here, the resources 108 provide audio for output at the device 106, with the audio being associated with the following question 128(4): "Okay. Would you to play the channel "the String Cheese Incident" on internet radio or play music from your personal storage?" In response, the user 104 states the following reply 128(5): "Internet radio, please."

After the device 106 captures this audio and provides a corresponding audio signal to the resources 108, the resources 108 may determine that the user 104 wishes to launch an application that provides internet radio and begin playing the channel entitled "the String Cheese Incident". In some instances, the resources 108 may have determined, from context associated with the user 104, that the user 104 has previously configured such a channel using the application. In response to making this determination, the response component 126 may perform a corresponding task, such as provide audio for output at the device 106 (e.g., "I'll begin playing your music shortly") as well as begin streaming the channel to the device 106.

In some instances, the remote computing resources may interact with applications hosted by one or more third-party services 130. For instance, the services 130 may include a music application that the resources 108 utilize to cause the requested music channel to be streamed to the device 106. In other instances, applications execute locally on the device 106 or on the remote computing resources 108.

Figure 1B:
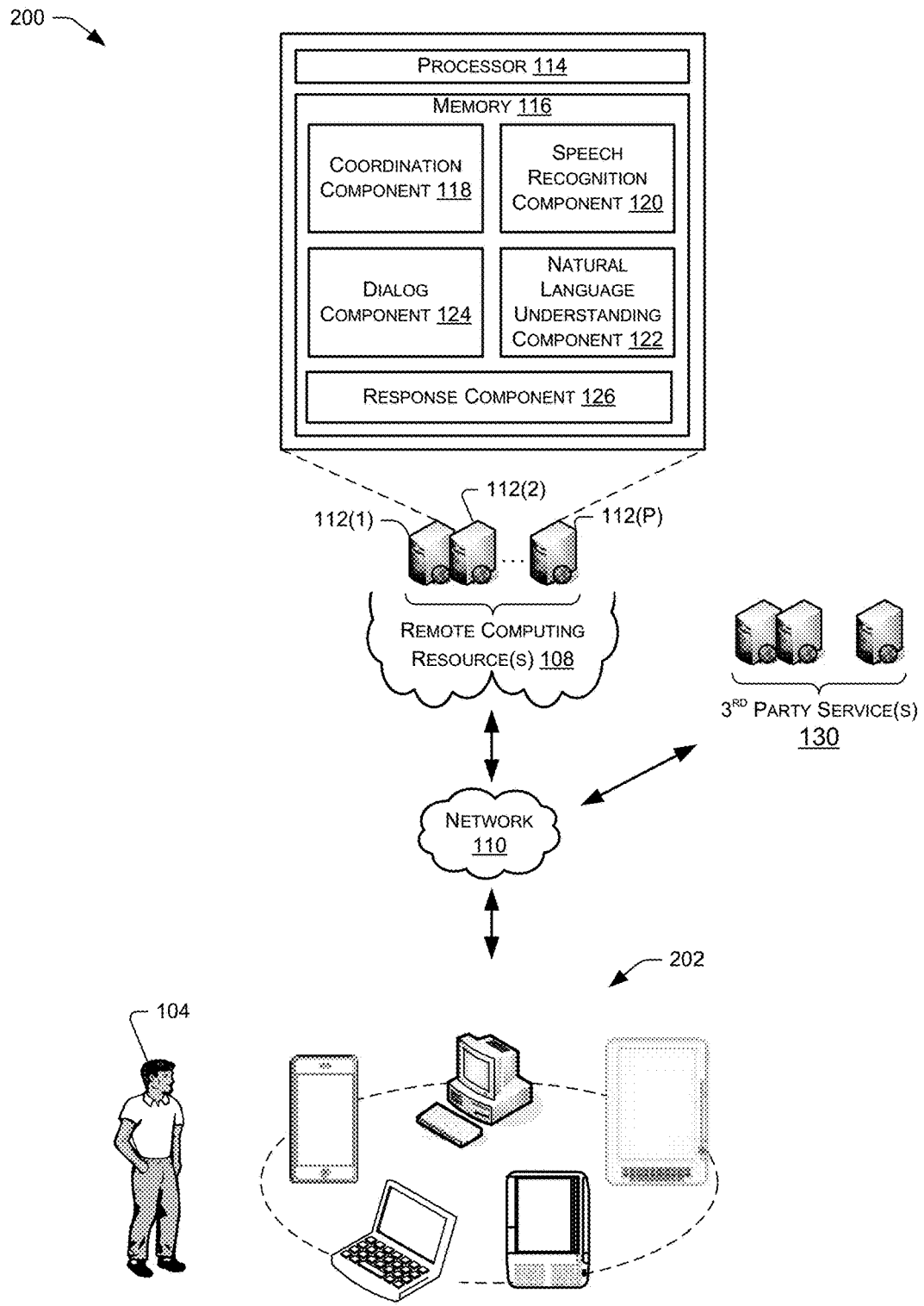
FIG. 1B illustrates that the remote computing devices and their associated functionality may be accessed via any number of client computing devices in addition to the voice-controlled device of FIG. 1A.

FIG. 1B illustrates illustrative another computing architecture 200, which includes many of the same components described above with reference to FIG. 1A. In this instance, however, the architecture 200 illustrates that the user 104 may access the functionality of the remote computing devices 108 via any number of client computing devices 202 other than the voice-controlled device of FIG. 1A. For instance, each of the illustrated devices may store or otherwise utilize a client application (e.g., a web application) for communicating with the remote computing resources 108. The application may allow the user 104 to interact via speech, text input, touch input, or in any other manner. In addition, the remote computing resources 108 may provide output for one or more client devices 202 in any manner. For instance, the resources 108 may provide visual content (e.g., images, video, text, etc.), audible content, haptic content, or the like. Furthermore, while a few example client devices are illustrated, it is to be appreciated that any type of client device may be utilized to interact with the remote computing resources 108 (e.g., smart phones, tablet computing devices, desktop computers, etc.).

Figure 2:
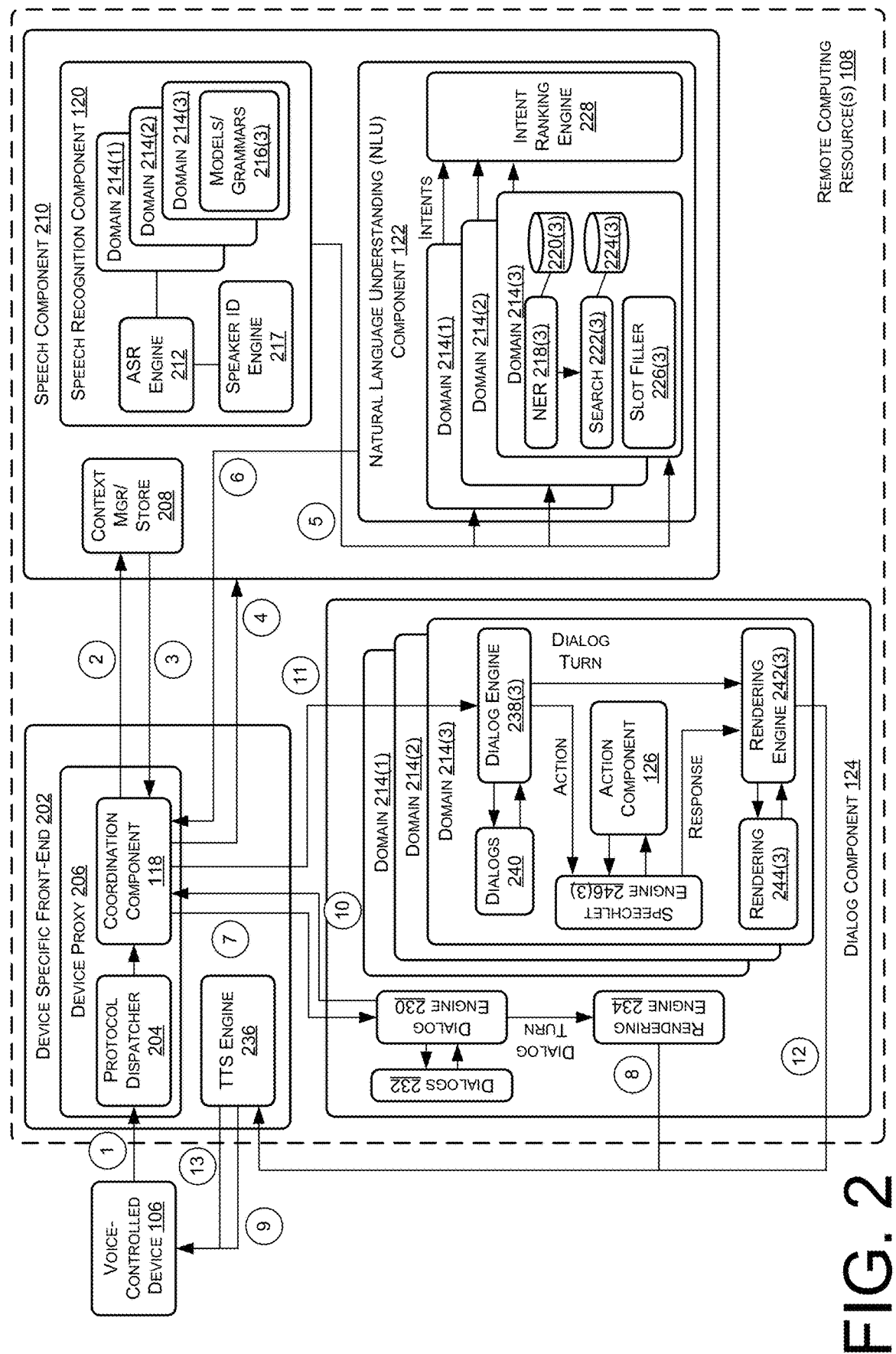
FIG. 2 shows illustrative components of the remote computing resources used to engage in an outcome-oriented dialog with a user that provides a voice command, such as the user from FIGS. 1A-B, in order to perform a task most likely desired by the user.

FIG. 2 shows illustrative components of the remote computing resources 108 used to identify the intent of a user that provides a voice command, such as the user 104. FIG. 2 also provides an example communication flow through these components. Of course, while FIG. 2 illustrates one example flow, it is to be appreciated that certain pieces of information may be passed among the components in any other manner in other implementations.

Initially, a user within an environment (e.g., the environment 102) may provide a voice command to the voice-controlled device 106, such as the example voice command illustrated in and described with reference to FIG. 1A. Thereafter, at "1", the voice-controlled device 106 may provide the audio signal that includes the voice command along with any metadata associated with audio signal to a device-specific front-end 202. The remote computing resources 108 may maintain one or more respective device-specific front-ends corresponding to different types of devices from which audio signals may be received. For instance, the remote computing resources 108 may utilize the illustrated front-end 202 when receiving audio signals from a voice-controlled device, such as the device 106. The resources 108 may utilize other front-ends when receiving audio signal from other types of devices.

As illustrated, a protocol dispatcher 204 of a device proxy 206 within the front-end 202 may initially receive the audio signal and the metadata. The protocol dispatcher 204 may be responsible for handling connections (e.g., SSL connections) between the device 106 and the remote computing resources 108. After receiving the signal and the metadata, the dispatcher 204 may provide this information to the coordination component 118. Generally, the coordination component 118 may coordinate the communication between components of the speech platform maintained by the remote computing resources 108. In addition, if the identity of the user associated with the audio signal has previously been determined, the protocol dispatcher 204 may obtain this information from storage and provide the identity of the user to the coordination component 118, the coordination component 118 may itself retrieve this information, or the known identity may be retrieved in any other manner (e.g., from the context store 208 described below).

In response to receiving the audio signal, at "2", the coordination component 118 retrieves any context associated with the speech (e.g., with a current dialog session with the user 14), the user 104 or the like from a context store maintained by a context manager 208. In some instances, applications that the user 104 has previously interacted with (or an application that the user 104 is currently interacting with as part of a session) may provide hints of expected or potential replies to the context store 208. That is, an application may indicate potential responses from the user to aid in identifying speech within the audio signal. At "3", the context manager 208 provides any context associated with speech to the coordination component 118.

At "4", the coordination component 118 provides the audio signal, the metadata and potentially the retrieved context (including the identity of the user if known) to a speech component 210. For instance, the coordination component 118 may provide this information to an automatic speech recognition (ASR) engine 212 of the speech component 210. The ASR engine 212 may perform speech recognition on the audio signal across multiple domains, such as domains 214(1), 214(2) and 214(3). While FIG. 2 illustrates three domains, it is to be appreciated that any number of domains may be utilized. As discussed above, a domain may represent a discrete set of activities having a common theme, such as "shopping", "music", "calendaring", etc. As such, each domain may be associated with a particular language model and/or grammar database 216, which the ASR engine 212 may use when performing the ASR.

In instances where the user identity is known, the ASR engine 212 may utilize past interactions with the identified user to generate the ASR results. For instance, the ASR engine 212 may utilize language models that are tailored to the particular user for identifying the speech. In addition, the ASR engine 212 (and each component described in this architecture) may utilize information known about the user to help determine the user's speech, intent, and the like. For instance, if a particular user is known to often request to play music at certain times of the day, then the ASR engine 212 may weight a request received at one of these times of day from the user as more likely to be a request to play music. Or, if a user is known to have been recently shopping for shoes, then this information may be used when interpreting the user's speech and/or selecting an intent of the user's speech.

Furthermore, in instances where the identity of the user that provided the speech is not known, the ASR engine 212 may communicate with a speaker identification (ID) engine 217 that attempts to identify the user. The speaker ID engine 217 may identify the user based on an array of criteria, such as a "voice print" associated with the audio signature, likely interpretations of the speech within the audio signal as determined by the ASR engine 212, and other information associated with the audio signal (e.g., a time of day that the speech is received, a client device that generated the audio signal, prior and recent interactions with the system, and the like). In some instances, a voice print is based at least in part on acoustic characteristics of an audio signal, such as frequency, tone, pitch, volume, and the like.

The speaker ID engine 217 may store or otherwise reference voice prints associated with respective users, as well as other information associated with these users, such as common requests made by the users, times of day that the respective users often issues requests, client devices that respective users often interact with, and the like. The speaker ID engine 217 may then attempt to identify a user associated with an audio signal by comparing characteristics of the audio signal (e.g., the voice print, time of day received, client device that generated the signal, and the like) to identify the user. The speaker ID engine 212 may in turn provide this information to the ASR engine 212, which may attempt to identify the speech (or re-identify the speech) based at least in part on prior requests of the identified user, preferences of the identified user, and the like.

After the ASR engine 212 generates ASR results based on the ASR, at "5", the speech recognition component 120 may provide the ASR results and the context to the domains 214(1)-(3) within the NLU component 122. In some instances, the ASR results comprise a phoneme-based lattice structure, an N-best list or the like.

The NLU component 122 receives the ASR results and attempts to generate a list of potential intents associated with the speech of the user based on both the ASR results and the received context, which again may include past interactions or preferences of the user, when known. As illustrated, the NLU component may generate these potential intents across the different domains 214(1)-(3) in this example. In order to generate a particular intent, each domain includes or is associated with a named-entity recognition (NER) component 218 and a search component 222. Each respective NER searches for named entities within the ASR results across a respective grammar database 220 that is custom to the particular domain. Each grammar database 220 includes the names of entities (i.e., nouns) commonly found in speech about the particular domain. For instance, a grammar database 220 associated with the shopping domain may include words commonly used when people discuss shopping. The search mechanism, meanwhile, may compare the ASR results across a catalog 224 of other words and information that is associated with the particular domain, such as "shopping".

In addition, each domain includes or is associated with a slot filler 226, which utilizes the received context (potentially including past interactions or user preferences) to fill one or more slots associated with a particular intent. For instance, if a particular intent is to "play song X", then the slot filler 226 may utilize the context to identify song X and, therefore, fill the corresponding slot in this intent. As described above, the context may be based on prior interactions with the user, hints from one or more applications or the like. For instance, envision that the user has previously requested to pause his music and subsequently states the following command: "please play my music". In order to execute the task of playing the song corresponding to the user's intent, the slot associated with which song the user wishes to play must be identified. In this instance, the user's previous interaction (requesting to pause the song) provides the context needed to fill this slot and play the song the system had previously paused.

The NLU component 122 may combine results from the NER component 218, the search component 222, and the slot filler 226 to generate a potential intent. In some instances, each domain may generate one or more potential intents based on the ASR results and the context, which may be provided to an intent ranking engine 228. The intent ranking engine 228 may then rank the received intents according to one or more predefined factors and may provide this ranked list as an output. In some instances, the engine 228 provides the entire list, while in other instances the engine 228 truncates the list to the top N intents.

At "6", the NLU component 122 provides the ranked list of intents back to the coordination component 118. In response, at "7", the coordination component 118 provides this list of intents across domains to a dialog engine 230 of the dialog component 124 for selecting a domain. In some instances, the dialog engine 230 may determine, based at least in part on the ranked list and corresponding probabilities associated with the intents, whether the dialog engine 230 is able to select a domain with a confidence that is greater than a predefined threshold. If so, then the dialog engine 230 provides an indication of the selected domain back to the coordination component 118 (illustrated as "10").

If not, however, then the dialog engine 230 references a dialog database 232 to determine one or more questions to pose to the user for the purpose of selecting a domain. In some instances, the remote computing resources again attempt, at this point, to identify the user that initiated the request at "1" through ASR or other techniques, such as by querying the user. Furthermore, the dialog engine 230 may utilize this information when determining the questions to pose to the user, as well as when otherwise communicating with the user. The dialog engine 230 then provides an indication of this question to a rendering engine, which in turn provides a rendering directive at "8" to a text-to-speech (TTS) engine 236. While FIG. 2 illustrates the TTS engine 236, the remote computing resources 108 may utilize an engine capable of rendering visual output in instances where the device 106 is additionally or alternatively capable of rendering visual content. That is, the remote computing resources 108 are capable of outputting any type of content (e.g., visual, audible, etc.) depending on the client to which the resources 108 provide the content. As such, the TTS engine 236 of FIG. 2 simply serves as an example where the client device comprises the voice-controlled device of FIG. 1A. In addition, while FIG. 2 illustrates the TTS engine 236 as residing within the front-end 202, in some instances the engine 236 comprises a service that is callable by the remote computing resources 108. At "9", the TTS engine 236 may provide the audio for output on the voice-controlled device 106. For instance, the TTS engine 236 may provide audio to ask the following question to the user (as determined by the dialog engine 230): "Do you wish to shop or listen to music?"

The device 106 may then capture audio that includes the user's reply, generate a corresponding audio signal and provide this audio signal to the protocol dispatcher 204. This additional audio signal may then flow through the system as described above with reference to the first audio signal, or may simply be provided directly from the coordination component 118 to the dialog engine 230. In some instances, the context associated with the session is updated in the context store 208, which may be done after each interaction with the user. After receiving the user's response, the dialog engine 230 may select an intent based on this additional audio signal or may select another question to pose to the user. At some point, at "10", the dialog engine 230 provides an indication of the selected domain back to the coordination component 118.

At "11", the coordination component 118 identifies those intents from the N intents that are associated with the selected domain and provides an indication of these intents to a dialog engine 238(3) associated with the selected domain (in this example domain 214(3)). The dialog engine 238(3) functions to select an intent from these intents. If the dialog engine 238(3) can select an intent with a confidence that is greater than a predefined threshold, then the engine 238(3) selects the intent. Otherwise, the dialog engine 238(3) may reference one or more dialogs 240. Each of the one or more dialogs 240 may be associated with a particular intent and/or tasks associated with the intent, may specify one or more conditions that indicate when a task associated with an the intent is complete and actionable, and may indicate steps that the dialog engine 238(3) should take in order to obtain the information. For instance, a particular dialog may indicate which information is necessary to create a task that is actionable and may indicate which questions to ask the user in order to obtain this information.

Upon identifying a particular intent, the dialog engine 238(3) may first identify multiple possible tasks associated with the intent. For instance, envision that a user states the following "Play The Joshua Tree on my cloud player", intending to reference an album by the band U2. In response, the intent of "play cloud-player music" may be identified, and the dialog engine 238(3) (or some other portion of the dialog component 124) may determine that this intent has four possible tasks: play all songs in a user's library, play all songs by one specific artist, play all songs on one specific album, and play one specific song by name. The engine 238(3) may also determine whether each task associated with the intent is complete, or whether more information from the user is needed to complete the task associated with the intent.

The dialog engine 238(3) may then work towards selecting a target task from the four possible tasks. To do so, the tasks corresponding to this intent may be defined, potentially including costs associated with obtaining the information needed to perform the respective tasks and probabilities that a user desired that the system perform the respective tasks.

In the example below, the "play cloud-player music" intent may be associated with the following tasks:

TABLE 1

| TaskName | Description | Outcome | Cost | Prerequisite |
| --- | --- | --- | --- | --- |
| PlayEntireLibrary | Play all sounds in user's library in set order | SUCCESS | 0 (no turn) | True( ) |
| PlayArtist | Play all songs by a given artist | SUCCESS | 0 | SlotPresent("ArtistName") |
| PlayAlbum | Play all songs on an album | SUCCESS | 0 | SlotPresent("AlbumName")AND SlotPresent("ArtistName") |
| PlaySong | Play one specific song | SUCCESS | 0 | SlotPresent("AlbumName")AND SlotPresent("ArtistName") AND SlotPresent("SongName") |

As shown above, SlotPresent("SongName") might not be sufficient to play a particular song, given that a user may have multiple songs in their library having the same title. If so, then the dialog component 124 may disambiguate to identify a single song/artist/album combination, as described below.

Further, note that in the above example this amount of configuration is enough is each single-turn case in this dialog example. Since the outcome of each of the four tasks above is SUCCESS, the dialog component 124 may identify the prerequisite(s) to decide which of the above is the "most specific true" prerequisite and may then execute the task or obtain enough information to execute the task.

Since no additional rules exist in this example, the component 124 may be configured to take different actions if the initial utterance simply identifies a song name or an album name without an artist name (as here in the example, "Play The Joshua Tree on my Cloud Player"). For instance, the system may choose to fail with an error message, stating that the user didn't provide enough information, or may fall back to the "PlayEntireLibrary" action since it is guaranteed to be true. In some instances, however, the dialog component may specifically request information from the user for identifying values of slots that remain unfilled. For instance, the dialog component 124 may support disambiguation by performing actions that are available to the system for obtaining information for making task a task actionable, with the actions including querying the user for different information as shown in Table 2 below:

TABLE 2

| ActionName | Description | Outcome | Cost | Prerequisite |
| --- | --- | --- | --- | --- |
| PromptForArtist | what artist do you want? | SlotPresent ("ArtistName") | 10 | TRUE |
| PromptForAlbum | What album do you want? | SlotPresent ("AlbumName") | 10 | TRUE |
| PromptforSong | What song do you want? | SlotPresent ("SongName") | 10 | TRUE |

If more information is needed, then the dialog engine may determine, from the dialog 240 that is associated with the intent or with the actions, question(s) to ask to the user, such as those shown above. These questions function to generate a reply for the purpose of moving closing to an actionable action. Table 3, below, illustrates examples of "next actions" that the dialog component 124 may perform after receiving example utterances.

TABLE 3

| Utterance | Next Task/Action | Why? |
|---|---|---|
| Play songs by U2 | PlayArtist (Task) | Outcome is SUCCESS; prerequisite is satisfied and more specific that the (also) true prerequisite for PlayEntireLibrary |
| Play The Joshua Tree | PromptforArtist (Action) | 1. Choose PlayAlbum as the target action since it only needs one more slot to be true; 2. PromptForArtist is the only prompt that can fill the ArtistName Slot |
| Play Where the Streets have no Name by U2 | PromptForAlbum (Action) | 1. Choose PlaySong as the target action (only action that uses SongName field 2. AlbumName is missing, so we an action which fills AlbumName |
| Play Where the Streets have no Name on The Joshua Tree | PromptForArtist (Action) | 1. Choose PlaySong as the target action (only action that uses SongName field 2. ArtistName is missing, so we an action which fills ArtistName |
| Play Where the Streets have no Name | PromptForArtist OR PromptForAlbum (Actions) | No reason with existing data to prefer prompting for artist or prompting for album |

In order to enhance a user experience from the above table, the dialog component 124 may infer certain values of fields of the four example actions described above. The following table provides one example of many ways to infer certain values:

TABLE 4

| ActionName | Description | Outcome | Cost | Prerequisite |
|---|---|---|---|---|
| InferArtistFromAlbum | Looks up an album in the user's library and sets the ArtistName based on that field | SlotPresent("ArtistName") | 1 | SlotPresent("AlbumName") |
| InferArtistandAlbumFromSong | Looks up a song name and sets both ArtistName and AlbumName slots based on the song information | SlotPresent("ArtistName")AND SlotPresent("AlbumName") | 1 | SlotPresent("SongName") |
| InferAlbumFromSongandArtist | Looks up a song by a particular artist, and sets the AlbumName field based on that lookup | SlotPresent("AlbumName") | 1 | SlotPresent("SongName") AND SlotPresent("ArtistName") |

As shown above, the dialog component 124 may perform an action of inferring certain values of certain fields associated with tasks if the inferred value is unambiguous based on the known values. In some instances, however, the dialog component 124 may request this information from the user. In instances where a value of a field is ambiguous, the action corresponding to this field may be modeled as a single action with multiple outcomes, as shown in the table below:

TABLE 5

| ActionName | Description | Prerequisite | Outcome | Cost | Probability |
|---|---|---|---|---|---|
| InferAlbumFromArtistOrPrompt | Looks up album in user's library and sets the ArtistName based on that field, or asks the user if mulitple possible values | SlotPresent("AlbumName") | SlotPresent("ArtistName") | 1 | 0.85 |
|  |  |  | SlotPresent("ArtistName") | 10 | 0.15 |
| InferArtistAndAlbumfromSong | Looks up a song name and sets both ArtistName and | SlotPresent("SongName") | SlotPresent("ArtistName") AND SlotPresent("AlbumName") | 1 | 0.6 |
|  |  |  | SlotPresent("ArtistName") AND | 1 | 0.3 |

TABLE 5-continued

| ActionName | Description | Prerequisite | Outcome | Cost | Probability |
|---|---|---|---|---|---|
| | AlbumName; if mulitple songs by same artist, sets the artist field and exits; if multiple songs by mulitple artists, prompts user for artist name | | SlotPresent("AlbumName") SlotPresent("ArtistName") AND SlotPresent("AlbumName") | 10 | 0.1 |

As shown above, the dialog component 124 may analyze both a probability that performing the action will result in obtaining a value corresponding to the field that the action is intended to fill, as well as the cost associated with obtaining the value (i.e., the cost of performing the action). For instance, the dialog component 124 may be biased towards filling a field rather than asking the user for the value, or may be biased in the other direction to generally or always ask the user if the dialog component 124 is not able to fill the field with an unambiguous value.

In other instances, meanwhile, the dialog component 124 may support fields having multiple possible values, as shown in the table below. By doing so, the dialog component 124 may model the two inference actions separately from actions involving prompting the user to choose between multiple values.

TABLE 7

| ActionName | Description | Prerequisite | Outcome | Cost | Probability |
|---|---|---|---|---|---|
| CheckCloudPlayerCredentials | Makes sure the active user has cloud player credentials and has authorized this device for streaming | True( ) | FAILURE | 1 | 0.1 |

TABLE 6

| ActionName | Description | Prerequisite | Outcome | Cost | Probability |
|---|---|---|---|---|---|
| InferArtistFromAlbum | Looks up an album in the user's library and sets the ArtistName based on the album; may set multiple values for artist | SlotPresent("AlbumName") | SlotPresent("ArtistName") SlotWithMultiple Values("ArtistName") | 1<br>1 | 0.85<br>0.15 |
| InferAlbumAndArtistFromSong | Looks up a song name and sets both ArtistName and AlbumName fields based on that song information. If multiple versions of a song, will set only the artist name | SlotPresent("SongName") | SlotPresent("ArtistName")AND-SlotPresent("AlbumName") SlotPresent("ArtistName") SlotWithMultiple Values("ArtistName") | 1<br>1<br>1 | 0.6<br>0.3<br>0.1 |
| PromptToDisambiguateArtist | Prompts the user to choose between two or three possible values for the ArtistName slot | SlotWithMultiple Values("ArtistName") | SlotPresent("ArtistName") | 10 | 0.95 |

While the above outcome-oriented dialogs analyze multiple successful outcomes, the dialog component 124 may also be configured to implement failure outcomes. As with the "success" outcomes described above, "failure" outcomes can be added to an action with a corresponding probability. It is noted that while the probabilities described herein may be set via estimation of the applications (e.g., a cloud-player application), over time these probabilities may be continually learned and re-calculated.

After identifying the target task to take, the dialog component 124 may cause the task to be performed, if the task is complete and actionable, or may identify one or more actions to take (e.g., inferring values, querying the user, etc.) to obtain values for fields associated with the target task if the task is not actionable. In the latter instances, the dialog component 124 may select an action to take based on a field that the action is intended to fill, a probability that the action will result in acquisition of a value for that field, and/or a cost associated with the action (with cost increasing based on an amount of dialogue with the user).

In instances where the component 124 selects an action comprising querying the user, the dialog engine 238(3) provides a request to output the question to a rendering engine 242(3), which works with a rendering component 244(3) to obtain a rendering directive. At "12", the rendering engine provides the rendering directive to the TTS engine 236, which provides audio to the device 106 for output on speakers of the device "at 13." For instance, the device 106 may pose the following question: "Would you like to listen to music on an internet radio application or from your personal storage?" or "Would you like to listen to the album 'The Joshua Tree' by U2?"

Again, the device 106 may capture the sound, generate an audio signal and provide the signal to the dispatcher 204. This additional audio signal may flow through the same communication signal described above (e.g., steps 1-11) or may be provided directly to the dialog engine 238(3). In either instance, the engine 238(3) may determine, using this additional information in the form of the user's reply, that the target task is now actionable and may perform the task. The engine 238(3) may then provide an indication of this task(s) to a speechlet engine 246(3), where different applications may register their respective interest in different intents selected by the engine 238(3). The speechlet engine 246(3) then works with the response component 126 to determine a response to provide to the rendering engine, and may also route the selected intent to the appropriate application.

A task may include providing audio for output on the device (e.g., "I will begin playing your music shortly"), as well as performing one or more additional tasks, such as requesting that an internet radio application begin streaming a particular channel to the device 106. Whatever the task(s) may be, at "12", the rendering engine 242(2) and potentially one or more external applications provide the rendering directives to the TTS engine 236, which in turn passes corresponding audio (e.g., a response, streaming audio, etc.) to the device 106. For instance, the rendering engine may provide audio for output on the device (e.g., "I will begin playing your music shortly"), while an internet radio application hosted by one of third-party services 130 may provide a rendering directive to begin streaming audio to the device 106, or while the afore-mentioned cloud-player application streams audio to the device 106. For instance, the dialog component 124 may send a request to the internet radio or cloud-player application, which may in turn return a uniform resource locator (URL). The resources 108 may then provide the URL to the device 106, which in turns requests content associated with the URL from the respective music application. As described above, in some instances the device 106 may alternatively utilize local applications or applications hosted by the remote computing resources 108. Furthermore, the third-party services 130 may comprise a reminder application for providing reminders to the device 106 and/or the resources 108, a weather application for providing weather forecasts to the device 106 and/or the resources 108, or any other type of application.

As described above with reference to the dialog engine 230 and the dialog engine 238(3), these dialog engines may utilize one or more dialogs with a user to reach an actionable goal, such as playing a requested internet radio station, setting a reminder for the user, or playing a particular album by a particular artist from the user's cloud-player application. These dialogs consist of questions posed to the user and responses received from the user. As described above, the questions may be provided to the user in different ways, depending upon the capabilities of the client device. For instance, the questions may be output audibly through a speaker and/or visually on a display.

In some instances, each intent is associated with a number of slots (or "fields") that, when filled with corresponding values, results in an actionable target action. For instance, an intent to "book an airline flight" may be associated with the following slots that need to be associated with values in order to create a completed and actionable intent: origin city, destination city, and travel date(s). In order to receive this information from a user, each intent may be associated with a particular dialog in some instances. For instance, in the example above, when the dialog engine determines that a user has expressed a travel-related intent, the dialog engine may determine multiple actions associated with this intent (including booking a flight), along with multiple fields of these actions and which fields already have values. The dialog engine may then select a target action and either perform the action or obtain remaining field values using a corresponding dialog with the user.

For instance, envision that a user's states the following: "I would like to book a round-trip flight from Seattle to Portland." After determining that the user's intent is travel-related and that the target action is, more specifically, to book a flight, the dialog engine will identify the fields or slots associated with this intent (origin city, destination city, travel date(s)) and will associate the fields with respective values provided by the user. Here, for instance, the dialog engine will associate "Seattle" as the origin city and "Portland" as the destination city. The dialog engine with then utilize the particular dialog associated with the travel intent and "book a flight" action to obtain the need travel dates. Here, for instance, the dialog engine may cause the user's client device to output the following question: "When you would like to leave for Portland and when would you like to return to Seattle?" In addition, the dialog engine may provide an indication (or hint) of this question to the context store 208 or directly to the NLU component 122 such that the NLU component 122 can expect that the user's next speech will be dates on which the user would like to fly to Portland and subsequently return to Seattle. In response to receiving the user's reply to this question, the dialog engine may associate the remaining field with the user's specified travel dates and the process of booking the user's ticket may begin.

Figure 3:
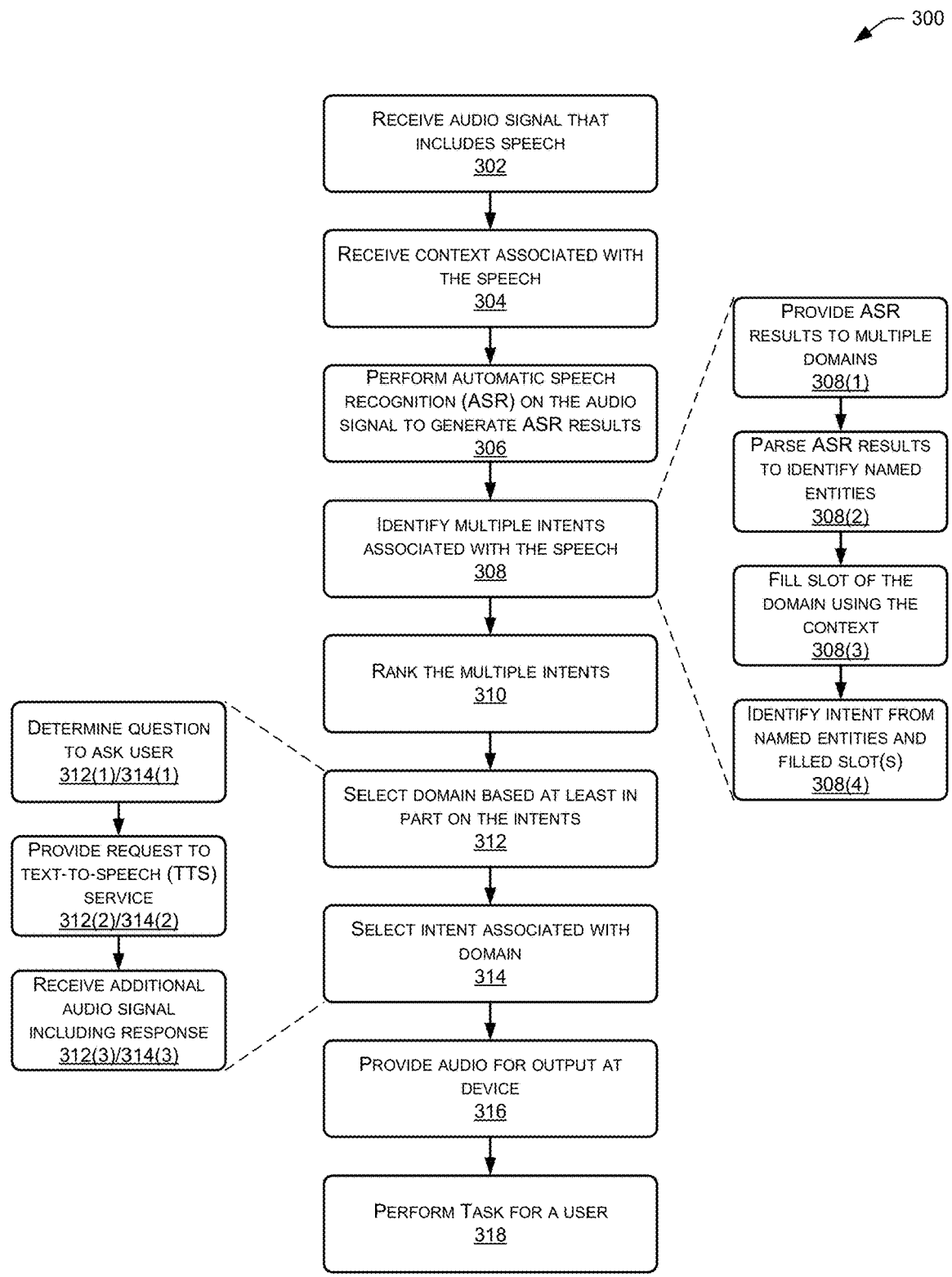
FIG. 3 illustrates an example process for receiving an audio signal, identifying a domain associated with speech from the audio signal, identifying an intent associated with the domain and the speech and providing audio for output on a voice-controlled device.

FIG. 3 illustrates an example process 300 for receiving an audio signal, identifying a domain associated with speech from the audio signal, identifying an intent associated with the domain and the speech and providing audio for output on a voice-controlled device. This process, as well as the processes described below with reference to FIGS. 4 and 5, may or may not be implemented using the outcome-oriented dialogs described above. Furthermore, each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 302, the process 300 receives an audio signal that includes speech. Although this and other figures describes receiving an audible input, in other instance the input may be received from a client device via text, touch, or the like. At 304, the process 300 receives context associated with the speech, which may include context associated with the actual request, context associated with the user that provides the speech, or the like. At 306, the process 300 performs automatic speech recognition (ASR) on the audio signal to generate ASR results. At 308, the process then identifies multiple intents associated with the speech.

Identifying the multiple intents may include multiple sub-operations in some instances. At 308(1), the process 300 provides the ASR to multiple domains and then, at 308(2), each domain parses the ASR results to identify named entities within the ASR results. Each respective domain may also fill one or more slots using the received context at 308(3). Finally, at 308(4), the process 300 may identify a particular intent based on the identified named entities and the slot(s) filled based on the context.

At 310, the process 300 then ranks the multiple intents. At 312, the process then selects a domain associated with the speech based at least in part on the ranked intents and, at 314, the process 300 then selects an intent associated with the selected domain. The operations 312 and/or 314 may include multiple sub-operations. A sub-operation 312(1)/314(1) comprises determining a question to ask a user. After identifying the question, a sub-operation 312(2)/314(2) then provides a request to a text-to-speech (TTS) service to audibly output the question on a speaker of a device. Thereafter, a sub-operation 312(3)/314(3) receives an additional audio signal that includes a response of a user to the question. Posing the question and receiving a user's response may aid in selecting a domain and/or selecting an intent at operations 312 and 314, respectively.

At 316, the process then provides audio for output at a device, such as the device that initially captured the user's speech. Again, while this and other figures describes providing audio for output, in other instances the output may be visual, haptic, audio, and/or the like. Finally, at 318, the process 300 performs a task for the user in addition to providing the audio for output at 316. This action may include purchasing an item for the user, playing a song for the user, calendaring an appointment for the user or the like.

Figure 4:
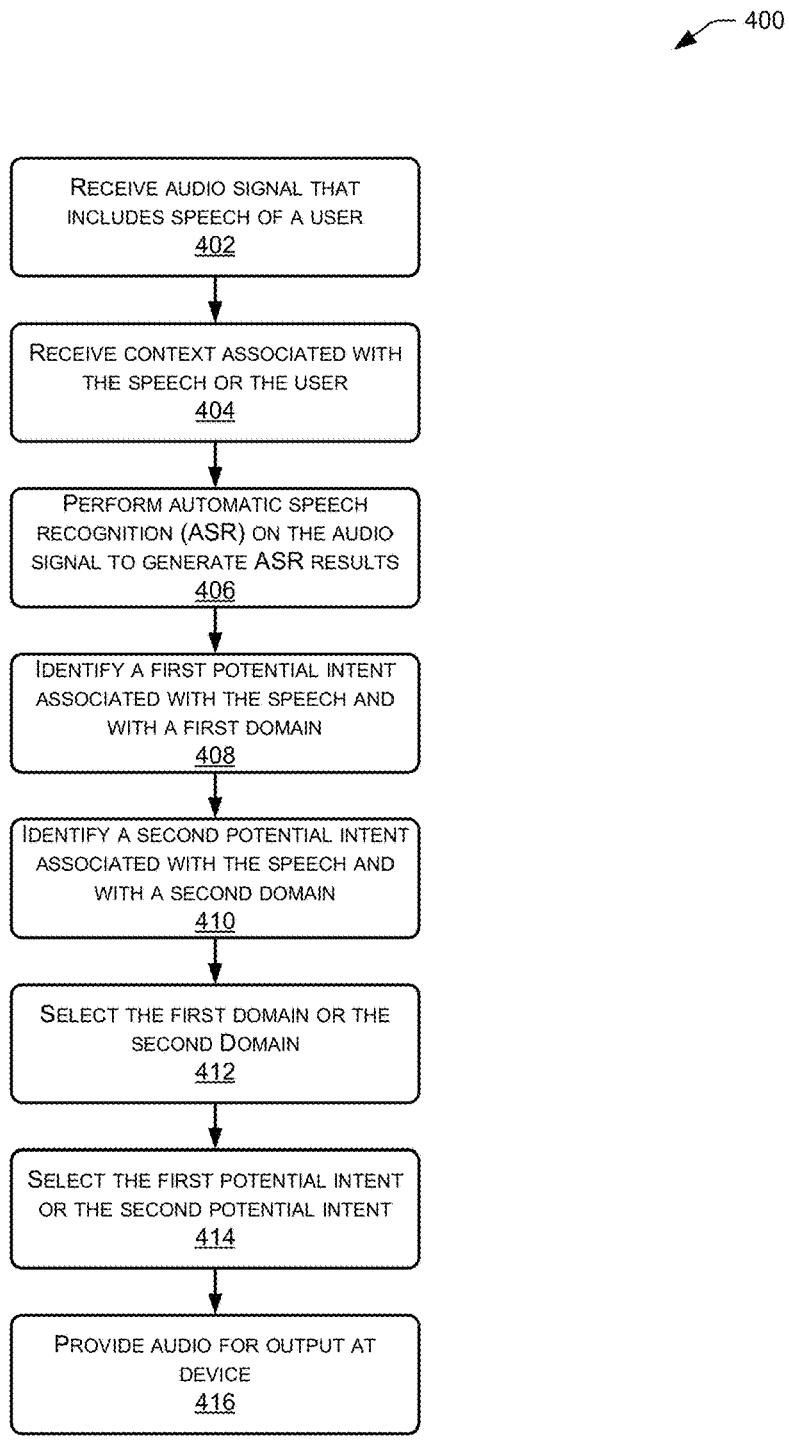
FIG. 4 illustrates an example process for receiving an audio signal, identifying a first potential intent of speech from the audio signal, a second potential intent of the speech, selecting one of the potential intents and providing audio for output on a voice-controlled device.

FIG. 4 illustrates an example process 400 for receiving an audio signal, identifying a first potential intent of speech from the audio signal, a second potential intent of the speech, selecting one of the potential intents and providing audio for output on a voice-controlled device.

At 402, the process 400 receives an audio signal that includes speech of a user. At 404, the process 400 receives context associated with the speech or the user. At 406 the process performs ASR on the audio to generate ASR results. At 408, the process 400 identifies a first potential intent associated with the speech, with the first potential intent being associated with a first domain. At 410, meanwhile, the process 400 identifies a second, different potential intent, with the second potential intent being associated with a second, different domain.

At 412, the process 400 selects the first domain or the second domain as mostly likely to be associated with the user's speech. The process 400 then selects, at 414, either the first potential intent or the second intent as most likely to be associated with the user's speech. This selection is based at least in part on the selection of the domain at 412. Finally, at 416, the process 400 provides audio for output on a device, such as the device that initially captured the user's speech and generated the corresponding audio signal.

Figure 5:
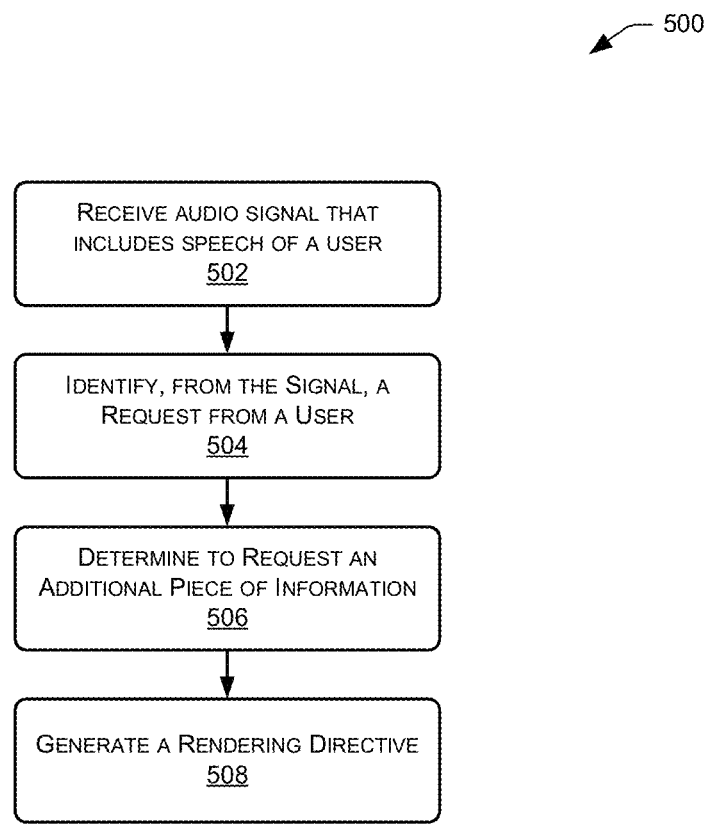
FIG. 5 illustrates an example process for engaging in a dialog with a user for the purpose of creating an actionable intent.

FIG. 5 illustrates an example process 500 for engaging in a dialog with a user for the purpose of creating an actionable intent. In some instances, some or all of this process 500 may be performed by the dialog component 124. At 502, the process 500 receives an audio signal that includes speech of a user, the audio signal generated from sound detected by a device that is proximate to the user. At 504, the process 500 identifies, from the audio signal, a request from the user to perform a task. At 506, the process 500 may then determine, based at least in part on the indication, to request at least one additional piece of information in order to obtain information sufficient for performing the task requested by the user. Finally, at 508, the process 500 may generate, based at least in part on determining to request the at least one additional piece of information, a rendering directive instructing the device proximate to the user to output a request that the user provide the at least one additional piece of information.

Figure 6:
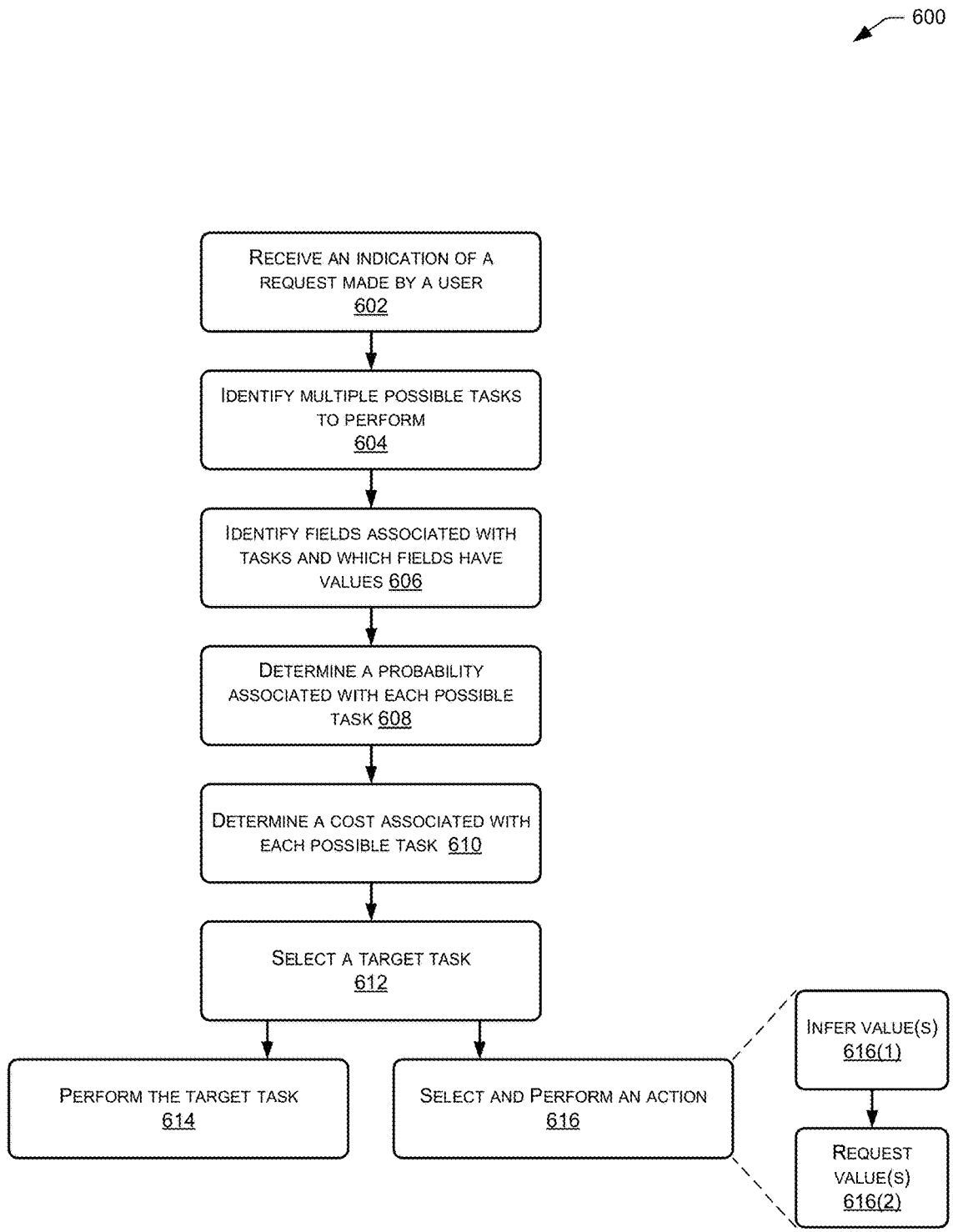
FIG. 6 illustrates an example process for receiving a request from a user, identifying multiple tasks that can be performed in response, and selecting a target task to perform.

FIG. 6 illustrates an example process 600 for receiving a request from a user, identifying multiple tasks that can be performed in response, and selecting a target task to perform. At 602, the process 600 receives an indication of a request made by a user, the request identified from an audio signal including speech of the user. For instance, a user may issue a voice command to "Play The Joshua Tree". At 604, the process identifies multiple possible tasks to perform in response to receiving the request. This may include, for example, playing an album entitled the Joshua Tree, playing a song entitled the Joshua Tree, playing a particular artist, or the like.

At 606, the process 600 identifies, for each of the multiple possible tasks: (1) one or more fields that, when filled with respective values, results in the respective possible task being actionable, and (2) which of the one or more fields have values based at least in part on the speech of the user. For instance, the process 600 may identify which fields are associated with the action to play an album, as well as which of these fields currently have values based on the user's request. At 608, the process 600 determines, for each of the multiple possible task, a probability that the user requested the respective possible task in the speech. At 610, meanwhile, the process 600 determines, for each of the multiple possible task, a cost associated with making the respective possible task actionable, the cost increasing with a number of questions needed to ask the user to fill in the one or more fields associated with the respective possible task.

With some or all of this information, at 612 the process 600 may select a task to perform. This selection may be based on (1) the multiple possible tasks, (2) the one or more fields associated with each respective possible task, (3) and which of the one or more fields associated with the respective possible task have values, potentially along with the respective probabilities and/or costs. At 614, the process 600 performs the target action, such as playing the album the Joshua Tree. Conversely, at 616 the process 600 may select an action for obtaining additional information for making the task actionable and may then perform the action. This selecting may be based on: (1) which one or more fields each respective action is intended to fill, (2) a cost associated with the respective action, the cost being greater if the respective action includes asking the user a question, and (3) a probability that performing the respective action will result in obtaining values for the one or more fields the respective action is intended to fill.

Performing the action may include inferring the values at 616(1) or requesting information for filling the values at 616(2). Inferring may comprise obtaining the values without requesting the user for additional information, and may be based on information contained in the speech or information associated with the user. For instance, the process 600 may infer that the user intended to play "The Joshua Tree" album by the band U2, given that the user owns an album by that band in the user's account. Requesting information for filling the values, however, may include providing a rendering directive for output at a device of the user, such as an audio signal for output at a voice-controlled device. In response, the user may provide a reply in the form of speech, from which an audio signal may be generated and information may be extracted for filling a value associated with a field of the target task.

Figure 7:
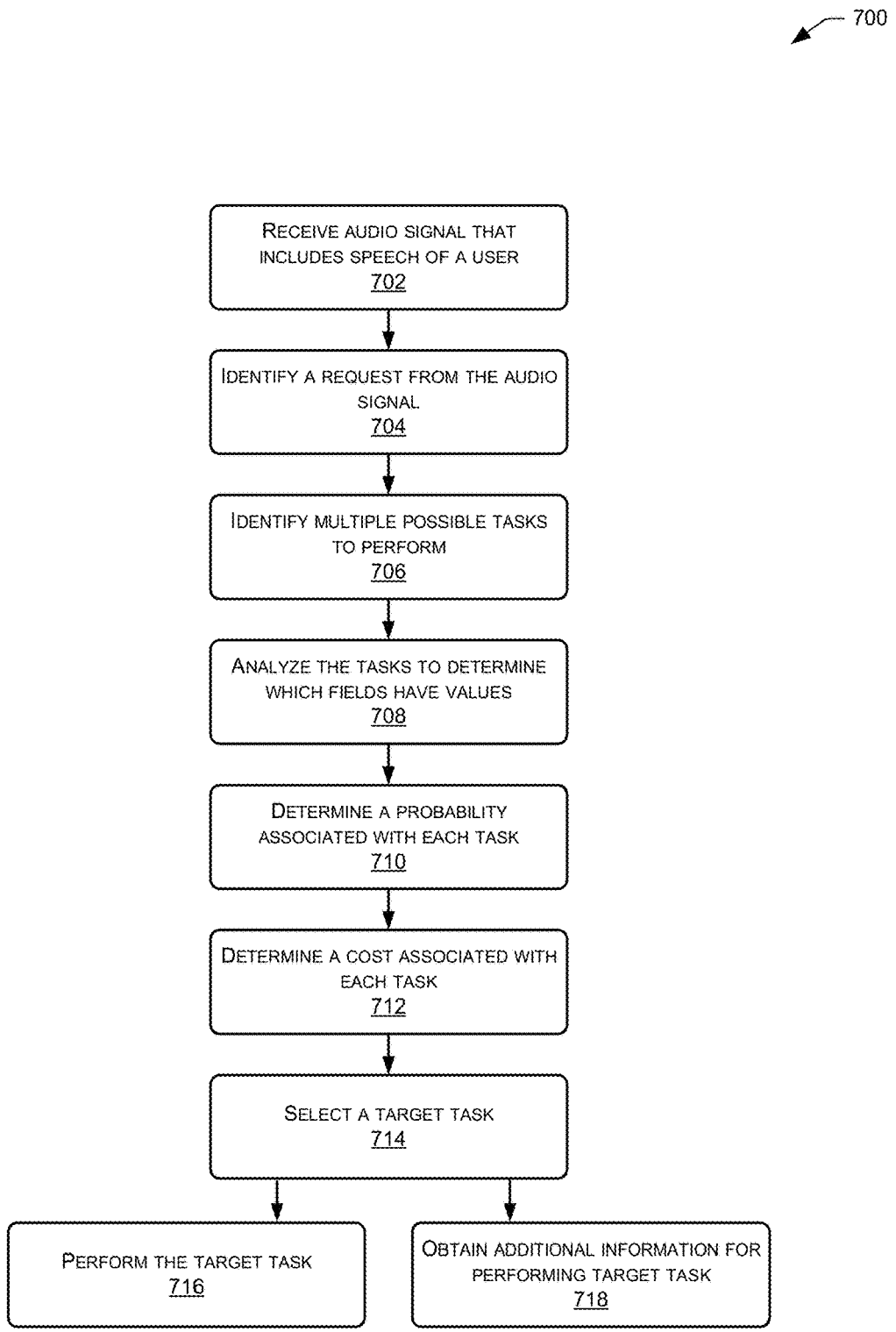
FIG. 7 illustrates another example process for receiving a request and selecting a target task to perform in response.

FIG. 7 illustrates another example process 700 for receiving a request and selecting a target task to perform in response. At 702, the process 700 receives an audio signal that includes speech of a user. At 704, the process 700 identifies, from the audio signal, a request from the user. At 706, the process 700 identifies multiple possible tasks to perform in response to the request, each of the multiple possible tasks being associated with one or more fields that, when filled with respective values, results in the respective task being actionable.

At 708, the process 700 analyzes each of the multiple possible tasks to determine which of the one or more fields are associated with respective values. In addition, at 710 the process 700 may also determine, for each of the multiple possible tasks, a probability that the user requested the respective possible action in the speech. At 712, the process 700 may determine a cost associated with each task. At 714, meanwhile, the process 700 may select a target task to perform based at least in part on the analyzing, the respective probabilities, and/or the respective costs. At 716, the process 700 may perform the target task, while at 718 the process 700 may instead first obtain additional information for performing the target task.

In order to obtaining additional information, the process 700 may select one of multiple actions to perform, which may include inferring information or querying the user for information. This selection may be based on at least one of: (1) a field(s) that a respective action is intended to fill, (2) a probability that performance of the action will result in acquisition of a value for this field(s), and (3) a cost of performing the action.

Figure 8:
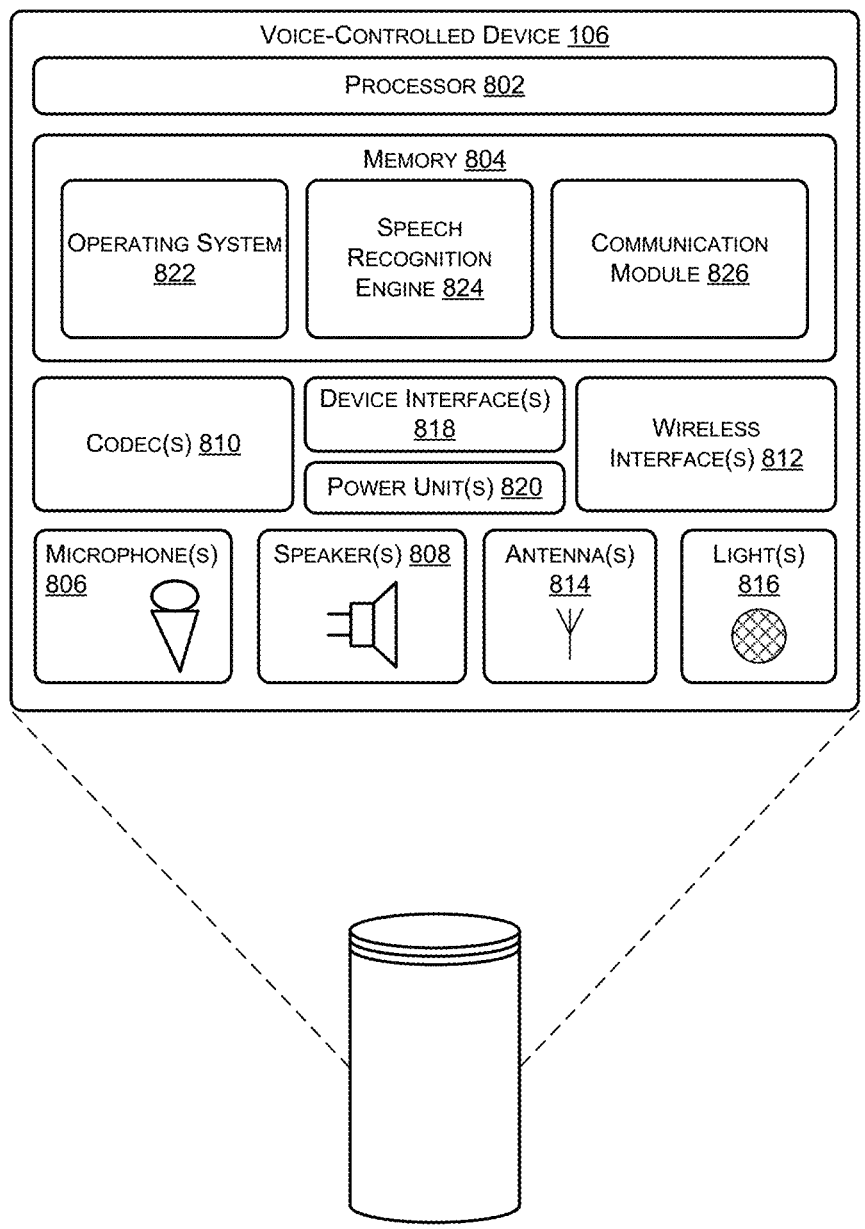
FIG. 8 shows a block diagram of selected functional components implemented in the voice-controlled device of FIG. 1A.

FIG. 8 shows selected functional components of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes a processor 802 and memory 804. The memory 804 may include computer-readable storage media ("CRSM"), which may be any available physical media accessible by the processor 802 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 802.

The voice-controlled device 106 includes a microphone unit that includes one or more microphones 806 to receive audio input, such as user voice input, and one or more speakers 808 to output audio sounds. One or more codecs 810 are coupled to the microphone unit 806 and the speakers 808 to encode and/or decode the audio signals. The codec may convert audio data between analog and digital formats. A user may interact with the device 106 by speaking to it, and the microphone unit 806 captures the user speech. The codec 810 encodes the user speech and transfers that audio data to other components. The device 106 can communicate back to the user by emitting audible statements through the speakers 808. In this manner, the user interacts with the voice-controlled device simply through speech, without use of a keyboard or display common to other types of devices.

In the illustrated example, the voice-controlled device 106 includes one or more wireless interfaces 812 coupled to one or more antennas 814 to facilitate a wireless connection to a network. The wireless interface 812 may implement one or more of various wireless technologies, such as WiFi, Bluetooth, RF, and so on. The voice-controlled device 106 may also include one or more lights 816, which in some instances are arranged around a top of the cylindrical housing of the device 106. The device 106 may illuminate the lights in a particular pattern based on voice commands received from the user 104 to indicate to the user 104 that the device 106 has received the user's particular command.

One or more device interfaces 818 (e.g., USB, broadband connection, etc.) may further be provided as part of the device 106 to facilitate a wired connection to a network, or a plug-in network device that communicates with other wireless networks. One or more power units 820 are further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be an additional simple light element (e.g., LED) to indicate a state such as, for example, when power is on. But, other than the described lights, the device 106 might not use or need to use any input devices or displays in some instances.

Several modules such as instruction, datastores, and so forth may be stored within the memory 804 and configured to execute on the processor 802. An operating system module 822 is configured to manage hardware and services (e.g., wireless unit, USB, Codec) within and coupled to the device 106 for the benefit of other modules. In addition, the memory 804 may include a speech recognition engine 824 and a communication module 826. The speech recognition engine 824 may perform automatic speech recognition (ASR) on audio signals generated by the microphone unit 806. In some instances, the engine 824 simply monitors the signals for a particular word or phrase and, upon identifying the word or phrase, begins streaming the generated audio signals to the remote computing resources 108 for more intensive ASR. The communication module 826, meanwhile, may function to provide the audio signals to the remote computing resources 108 and receive communications from the resources 108 in response.

While the foregoing modules are described as residing on the device, some or all of these modules and components may reside additionally or alternatively at the remote computing resources 108.

Furthermore, while the examples above describe a voice-controlled assistant as interfacing with the speech recognition platform, any other type of device may interface with this platform. For instance, a user may use a multipurpose communication device (i.e., a smartphone), a laptop computer, a desktop computer, a tablet computing device or any other type of device to interface with the platform. In some of these instances, the devices may utilize a client application (e.g., a standalone application, a web application running on a browser, etc.) to provide speech from the users to the speech recognition platform, or may provide input via text, touch, or in any other manner.

In one example, a user may be able to control features of a smartphone using speech. For instance, a user may provide voice commands to the smartphone (e.g., mute, call, hang up, transfer, etc.), with speech representing these voice commands being provided to the speech recognition platform. The platform may perform the process described above to perform the appropriate action, such as instruct the smartphone to mute its microphone, instruct the smartphone to end a current telephone call or the like.

In another example, a user may link his or her laptop (for example) to a voice-controlled device, with the laptop running an application that interfaces with the speech recognition platform. Continuing the example from immediately above, the application may include soft buttons corresponding to the user's smartphone, such as mute, end call, transfer, etc. The user may then provide voice commands that are received by the voice-controlled device and then sent to the platform. The platform may then interface with the voice-controlled device, the laptop or potentially the smartphone to perform the action corresponding to the received voice command.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and
non-transitory computer-readable media storing computer-executable instructions that, when executed by the one or more processors, cause the one or more processors to perform operations comprising:
receiving first audio data representing speech input;
generating speech-recognition data based at least in part on the first audio data;
receiving first data indicating a context associated with the first audio data, the context including an indication of content being displayed on a display of a device while the first audio data is received; and
generating, based at least in part on the speech-recognition data and the first data, second audio data to be output by the device, the second audio data representing a response to the speech input.

2. The system of claim 1, wherein the context includes data representing a voice print associated with the first audio data, the voice print indicating an identity of a user that provided the speech input.

3. The system of claim 1, wherein the content comprises text being displayed on the display of the device.

4. The system of claim 1, wherein the response to the speech input comprises an identifier of a user.

5. The system of claim 1, wherein the first data includes at least one of previous speech-recognition data or intent data representing at least one previous speech input.

6. The system of claim 1, wherein the context includes a location of the device.

7. The system of claim 2, wherein the voice print is based at least in part on acoustic characteristics of the first audio data.

8. The system of claim 1, wherein the context includes historical appointment requests associated with previous speech input.

9. The system of claim 1, wherein the context includes historical purchase information associated with previous speech input.

10. The system of claim 1, wherein the context includes a time of day when the first audio data is received.

11. A method comprising:
receiving first audio data representing speech input;
generating speech-recognition data based at least in part on the first audio data;
receiving first data indicating a context associated with the first audio data, the context including an indication of content being displayed on a display of a device while the first audio data is received; and
generating, based at least in part on the speech-recognition data and the first data, second audio data to be output by the device, the second audio data representing a response to the speech input.

12. The method of claim 11, wherein the context includes data representing a voice print associated with the first audio data, the voice print indicating an identity of a user that provided the speech input.

13. The method of claim 11, wherein the response to the speech input comprises an identifier of a user.

14. The method of claim 11, wherein the content comprises text being displayed on the display of the device.

15. The method of claim 11, wherein the indication is a first indication and the content comprises a second indication of an activity associated with the device.

16. The method of claim 11, wherein the context includes a location of a computing device from which the first audio data is received.

17. The method of claim 11, wherein the indication is a first indication and the content comprises a second indication of an application being utilized by the device.

18. The method of claim 11, wherein the context includes historical appointment requests associated with previous speech input.

19. The method of claim 11, wherein the context includes historical purchase information associated with previous speech input.

20. The method of claim 11, wherein the context includes a time of day when the first audio data is received.

* * * * *